(12) United States Patent
Lai et al.

(10) Patent No.: US 7,989,098 B2
(45) Date of Patent: Aug. 2, 2011

(54) PERPENDICULAR MAGNETIC RECORDING MEDIUM

(75) Inventors: Chih-Huang Lai, Hsinchu (TW);
Jung-Wei Liao, Hsinchu (TW);
Hao-Cheng Hou, Hsinchu (TW);
Meng-Shian Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 12/487,550

(22) Filed: Jun. 18, 2009

(65) Prior Publication Data
US 2010/0159280 A1    Jun. 24, 2010

(30) Foreign Application Priority Data

Dec. 22, 2008  (TW) ............................ 97150053 A
May 21, 2009  (TW) ............................ 98116868 A

(51) Int. Cl.
*G11B 5/66* (2006.01)
(52) U.S. Cl. ...................................................... 428/832
(58) Field of Classification Search .................... None
See application file for complete search history.

(56) References Cited

U.S. PATENT DOCUMENTS

| | | | |
|---|---|---|---|
| 2007/0048552 A1* | 3/2007 | Soeya | 428/828 |
| 2008/0085426 A1* | 4/2008 | Kurita | 428/828.1 |
| 2008/0166596 A1 | 7/2008 | Das et al. | |
| 2009/0226764 A1* | 9/2009 | Srinivasan et al. | 428/846 |

\* cited by examiner

*Primary Examiner* — Holly Rickman
(74) *Attorney, Agent, or Firm* — Christie, Parker & Hale, LLP

(57) ABSTRACT

A perpendicular magnetic recording medium includes a substrate, an antiferromagnetic layer disposed above the substrate, and a perpendicular magnetic recording layer formed on the antiferromagnetic layer and exchange-coupled to the antiferromagnetic layer.

7 Claims, 8 Drawing Sheets

PERPENDICULAR MAGNETIC RECORDING MEDIUM

CROSS-REFERENCE TO RELATED APPLICATIONS

This application claims priority of Taiwanese Application No. 097150053, filed on Dec. 22, 2008, and Taiwanese Application No. 098116868, filed on May 21, 2009.

BACKGROUND OF THE INVENTION

1. Field of the Invention

This invention relates to a perpendicular magnetic recording medium (PRM), more particularly to a perpendicular magnetic recording medium having an antiferromagnetic layer and a perpendicular magnetic recording layer formed on the antiferromagnetic layer and exchange-coupled to the antiferromagnetic layer.

2. Description of the Related Art

As technology advances, approaches have been made to increase the recording density of a magnetic recording medium. However, an increase in the recording density may cause superparamagnetic problem, i.e., the magnetic recording layer has an unstable magnetic moment, to occur.

The superparamagnetic problem can be alleviated by using a perpendicular magnetic recording medium. The perpendicular magnetic recording medium includes a magnetic recording layer with magnetic moments directed to a direction normal to the magnetic recording layer so that the stability of the magnetic moments and the magnetic anisotropic energy (Ku) of the magnetic recording layer can be increased.

Referring to FIG. 1, U.S. Patent Application Pub. No. 2008/0166596 A1 discloses a perpendicular magnetic recording medium (PRM) 1 that includes a substrate 11, an adhesion layer 12 formed on the substrate 11, a soft magnetic underlayer (SMUL) 13 formed on the adhesion layer 12, a Re-based alloy interlayer 14, such as ReMn alloy, formed on the SMUL 13, a perpendicular hard magnetic layer 15 formed on the Re-based alloy interlayer 14, a protective overcoat 16 formed on the perpendicular hard magnetic layer 15, and a lubricant topcoat 17 formed on the protective overcoat 16. The Re-based alloy interlayer 14 functions to refine the grain size of the perpendicular hard magnetic layer 15 and to enable the perpendicular hard magnetic layer 15 to have a desired orientation texture, i.e., (0002) orientation texture, along a direction normal to the perpendicular hard magnetic layer 15. For instance, when the Re-based alloy interlayer 14 is made from ReMn alloy, since Mn atoms of the ReMn alloy have a solubility lower than 6 at %, an excessive amount of Mn present in the ReMn alloy will cause segregation of Mn atoms to occur at the grain boundaries of the Re crystal grains, which results in grain refinement of the Re-based alloy interlayer 14, which, in turn, results in grain refinement of the perpendicular hard magnetic layer 15 and an increase in the recording density of the PRM 1. In addition, the magnetic anisotropy energy (Ku) and coercive field (Hc) of the perpendicular hard magnetic layer 15 can be increased by virtue of the (0002) orientation texture possessed by the perpendicular hard magnetic layer 15.

Referring to FIG. 2, U.S. Patent Application Pub. No. 2008/0085426 A1 discloses an exchange coupled composite perpendicular magnetic recording medium (ECCPRM) 2 that includes a substrate 21, a soft magnetic lining layer 22 formed on the substrate 21, a seed layer 23 formed on the soft magnetic lining layer 22, a foundation layer 24 formed on the seed layer 23, a Ru-based alloy middle layer 25, such as RuMn, having a hcp crystal structure and formed on the foundation layer 24, a recording layer 26 formed on the Ru-based alloy middle layer 25, a protective layer 27 formed on the recording layer 26, and a lubricating layer 28 formed on the protective layer 27. The recording layer 26 includes a first recording film 261, an exchange-coupling-strength control film 262 made from Ru-based alloy, such as RuMn, an auxiliary recording film 263, and a second recording film 264 from bottom to top in this sequence so as to form an exchange-coupling in ferromagnetism between the first recording film 261 and the auxiliary recording film 263 and to decrease the switching field (Hs) of the ECCPRM 2. It is noted that the purpose of including the Ru-based (RuMn) alloy middle layer 25 in the ECCPRM 2 is to provide a function similar to the Re-based (ReMn) alloy interlayer 14 in the aforementioned PRM 1 so that the (0002) orientation texture, the magnetic anisotropy energy (Ku), and the coercive field (Hc) of the recording layer 26 can be improved.

However, there still remains a need in the art to provide a perpendicular magnetic recording medium having a magnetic recording layer which exhibits superior orientation texture, Ku, and Hc.

SUMMARY OF THE INVENTION

An object of the present invention is to provide a perpendicular magnetic recording medium that includes a magnetic recording layer having improved magnetic anisotropy energy (Ku), and coercive field (Hc).

According to this invention, there is provided a perpendicular magnetic recording medium that comprises a substrate, an antiferromagnetic layer disposed above the substrate, and a perpendicular magnetic recording layer formed on the antiferromagnetic layer and exchange-coupled to the antiferromagnetic layer.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
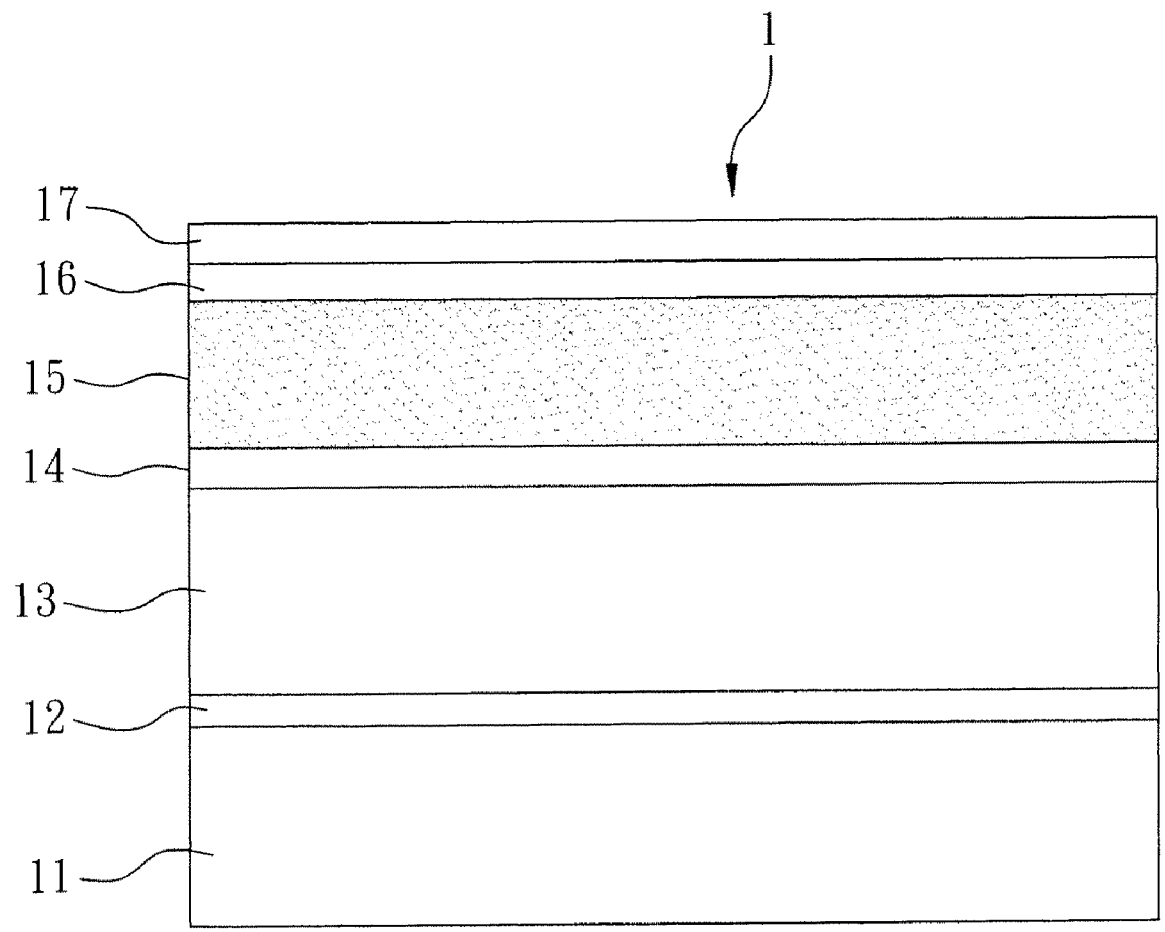
FIG. 1 is a schematic view to illustrate the structure of a PRM disclosed in U.S. Patent Application Pub. No. 2008/0166596 A1.
Figure 2:
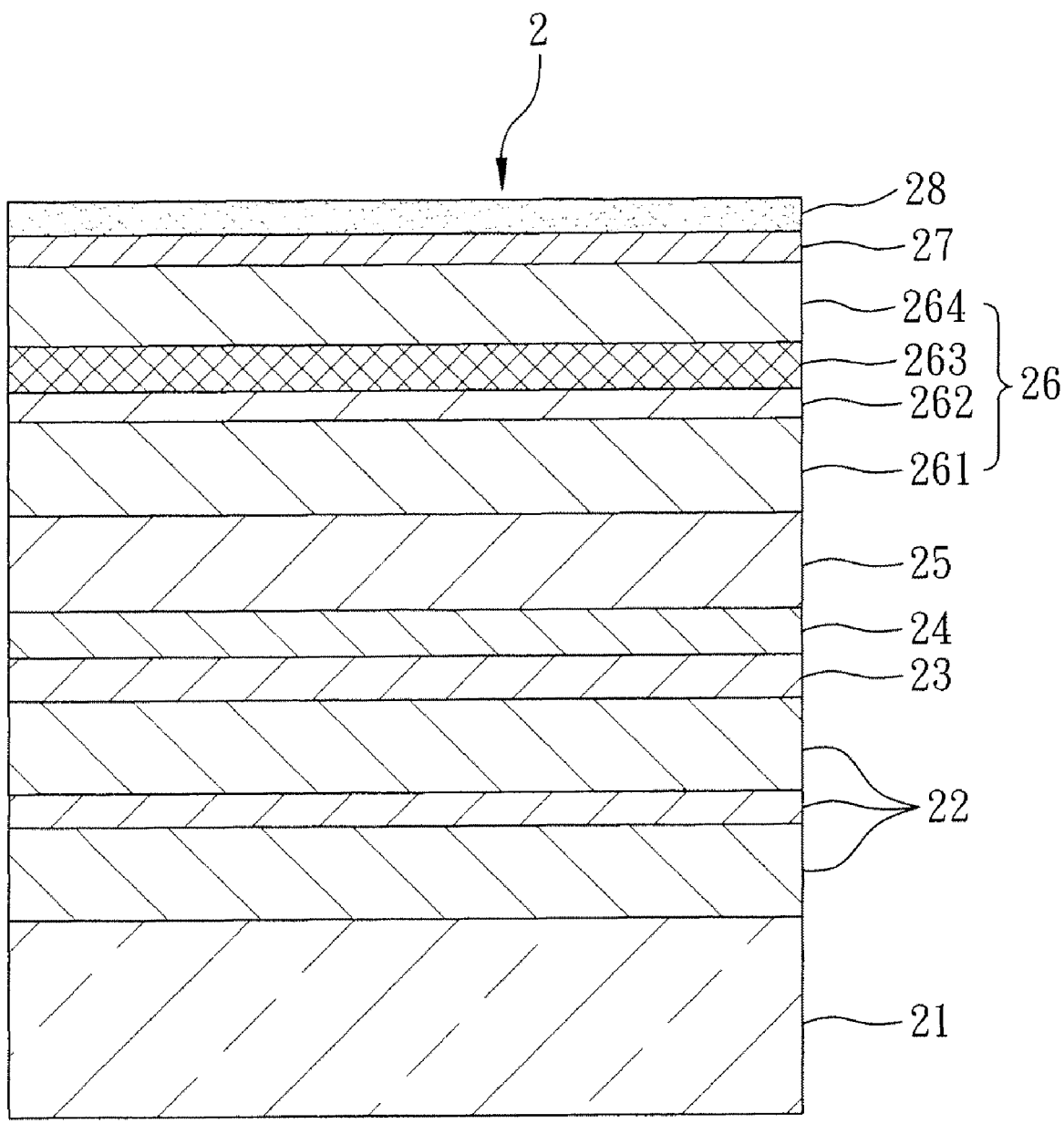
FIG. 2 is a cross-sectional view to illustrate the structure of an ECCPMR disclosed in U.S. Patent Application Pub. No. 2008/0085426 A1.
Figure 3:
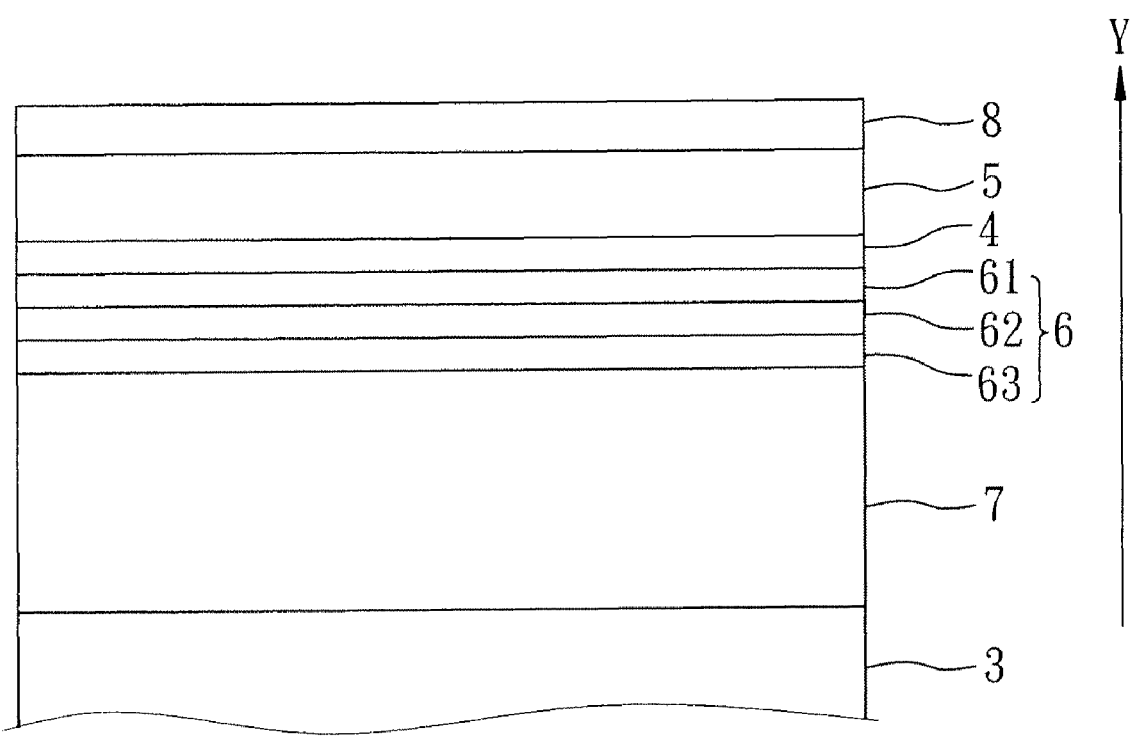
FIG. 3 is a fragmentary schematic view to illustrate the preferred embodiment of a perpendicular magnetic recording medium according to this invention.
Figure 4:
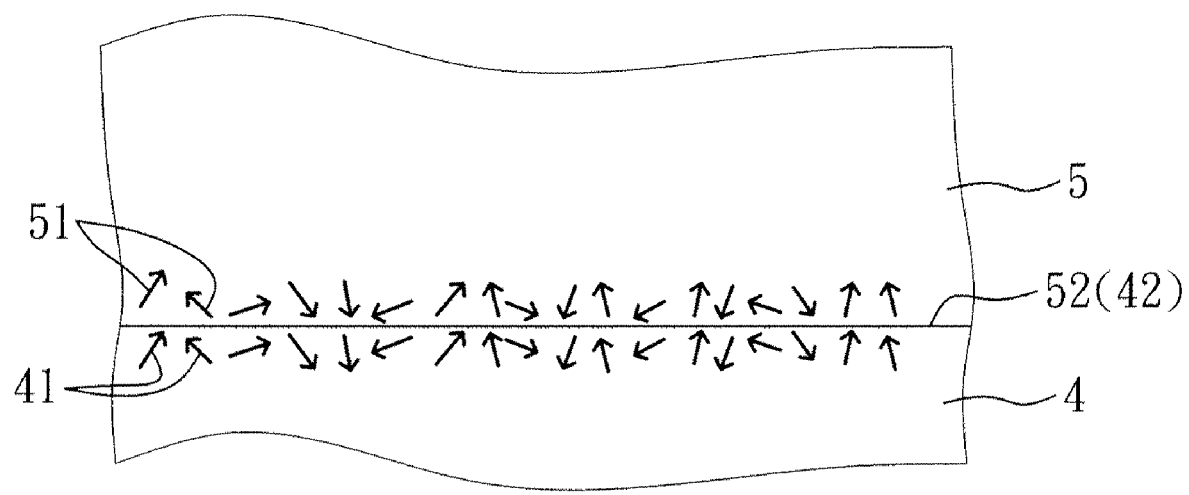
FIG. 4 is a fragmentary schematic view to illustrate exchange-coupling between an antiferromagnetic layer and a perpendicular magnetic recording layer of the preferred embodiment.

FIGS. 3 and 4 illustrate the preferred embodiment of a perpendicular magnetic recording medium according to the present invention. The perpendicular magnetic recording medium includes a substrate 3, an antiferromagnetic layer 4 disposed above the substrate 3, and a perpendicular magnetic recording layer 5 formed on the antiferromagnetic layer 4 and exchange-coupled in antiferromagnetism to the antiferromagnetic layer 4 so as to permit magnetic moments 51 of the perpendicular magnetic recording layer 5 located at a surface 52 of the perpendicular magnetic recording layer 5 to be pinned by the antiferromagnetic layer 4 in a manner to be parallel to adjacent magnetic moments 41 of the antiferromagnetic layer 4 located at a surface 42 of the antiferromagnetic layer 4 that is in face-to-face contact with the surface 52 of the perpendicular magnetic recording layer 5 (see FIG. 4). The exchange-coupling between the antiferromagnetic layer 4 and the perpendicular magnetic recording layer 5 results in an increase in a magnetic anisotropy energy (Ku) of the perpendicular magnetic recording layer 5, which, in turn, results in an increase in a coercive field (Hc) of the perpendicular magnetic recording layer 5, thereby stabilizing the magnetic moments 51 of the perpendicular magnetic recording layer 5.

Preferably, the substrate 3 is made from Si, glass, or AlMg alloy.

Preferably, the perpendicular magnetic recording layer 5 is made from a complex material containing a hard ferromagnetic alloy and an oxide. The hard ferromagnetic alloy can be Co-based alloy or Fe-based alloy. The oxide can be $SiO_2$. For example, $CoPtCr-SiO_2$ or $FePt-SiO_2$ can be used as the complex material in this invention. It is noted that the $SiO_2$ constituent is insoluble in the Co constituent of the compound $CoPtCr-SiO_2$. As a consequence, the $SiO_2$ constituent can be segregated at the CoPt grain boundaries. This results in refinement of the grain size of the CoPt grains.

Preferably, the antiferromagnetic layer 4 contains a Mn-based alloy. Preferably, the Mn-based alloy has a formula of $Mn_xZ_{100-x}$. When x is higher than 68 at %, an excessive amount of $SiO_2$ will be segregated at CoPt grain boundaries, which can result in a decrease in the coercive field (Hc) of the perpendicular magnetic recording layer 5. Preferably, x ranges from 50 at % to 68 at %, and more preferably from 60 at % to 68 at %. Preferably, Z is selected from the group consisting of Pt, Pd, Ir, Rh, Ru, Os, Ni, Fe, Cr, Co, and combinations thereof, andmore preferably, from Ru. It is noted that the value of x varies with different materials used for the perpendicular magnetic recording layer 5.

Preferably, the antiferromagnetic layer 4 is formed of cylindrical grains, each of which has an axis substantially normal to the substrate 3.

Preferably, the antiferromagnetic layer 4 has a crystal structure with stacking faults (SFs). The crystal structure can be a face-centered cubic (fcc) crystal structure or a hexagonal close-packed (hcp) crystal structure.

Preferably, the preferred embodiment further includes a non-magnetic film 6 disposed between the substrate 3 and the antiferromagnetic layer 4, a soft magnetic layer 7 disposed between the substrate 3 and the antiferromagnetic layer 4, and a protective layer 8 formed on the perpendicular magnetic recording layer 5.

The non-magnetic film 6 has a first interlayer 61 disposed between the substrate 3 and the antiferromagnetic layer 4, a second interlayer 62 disposed between the substrate 3 and the first interlayer 61, and a third interlayer 63 disposed between the substrate 3 and the second interlayer 62.

Preferably, the first interlayer 61 has a hexagonal close-packed (hcp) crystal structure or a cubic crystal structure, and is made from a first metallic material selected from the group consisting of Ru, Ti, Re, Os, Cr, Zn, Zr, Tc, Mg, Rh, W, and combinations thereof.

Preferably, the second interlayer 62 has a face-centered cubic (fcc) crystal structure, and is made from a second metallic material selected from the group consisting of Pt, Pd, Cu, Au, Ag, and combinations thereof.

Preferably, the third interlayer 63 is an amorphous layer and is made from a third metallic material selected from the group consisting of terbium (Tb), gadolinium (Gd), dysprosium (Dy), tantalum (Ta), hafnium (Hf), and combinations thereof.

Preferably, the antiferromagnetic layer 4 has a layer thickness ranging from 2 nm to 15 nm, and more preferably, from 5 nm to 10 nm. When the layer thickness of the antiferromagnetic layer 4 is less than 2 nm, an uneven distribution of the magnetic grain size of the perpendicular magnetic recording layer 5 can occur. When the layer thickness of the antiferromagnetic layer 4 is greater than 15 nm, the writing efficiency will be considerably decreased due to an excessive distance between the soft magnetic layer 7 and a writing head (not shown).

The first interlayer 61 cooperates with the second interlayer 62 and the third interlayer 63 to provide a function that improves the (0002) orientation texture of magnetic grains of the perpendicular magnetic recording layer 5, thereby increasing the out-of-plane squareness ($S_\perp$) of the perpendicular magnetic recording layer 5. The squareness ($S_\perp$) is defined as Mr/Ms, wherein Mr and Ms represent the remanent magnetization and the saturation magnetization, respectively. The squareness ($S_\perp$) varies between 0 to 1. The higher the value of the squareness ($S_\perp$), the higher will be the signal-to-noise ratio (SNR).

Preferably, the first interlayer 61 has a layer thickness ranging from 2 nm to 15 nm, and more preferably, from 5 nm to 10 nm. When the layer thickness of the first interlayer 61 is less than 2 nm, the perpendicular magnetic recording layer 5 has an uneven distribution of c axis (<0002> direction). When the layer thickness of the first interlayer 61 is greater than 15 nm, the writing efficiency is considerably decreased.

Preferably, the first interlayer 61 is conducted through sputtering techniques under a working pressure ranging from 1 mTorr to 15 mTorr. This facilitates the growth of the crystal grains of the first interlayer 61 along the c axis (<0002> direction).

Preferably, the antiferromagnetic layer 4 is conducted through sputtering techniques under a working pressure ranging from 15 mTorr to 100 mTorr, a first output power of a Ru target ranging from 100 W to 50 W, and a second output power of a Mn target being 100 W. This facilitates formation of the antiferromagnetic layer 4 with a surface roughness sufficient to cause the $SiO_2$ constituent to be segregated at the CoPt grain boundaries for refining the CoPt grain size of the perpendicular magnetic recording layer 5.

EXAMPLES

Example 1 (E1)

Referring back to FIG. 3, the perpendicular magnetic recording medium of Example 1 (E1) includes a substrate 3 made from AlMg alloy, a soft magnetic layer 7 made from CoZrTa alloy and having a layer thickness of 300 nm, a third interlayer 63 made from Ta and having a layer thickness of 3 nm, a second interlayer 62 made from Pt with a fcc crystal structure and having a layer thickness of 7 nm, a first interlayer 61 made from Ru with a hcp crystal structure and having a layer thickness of 10 nm, an antiferromagnetic layer 4 made from $Mn_{56}Ru_{44}$ (see Table 1) and having a layer thickness of 7 nm, a perpendicular magnetic recording layer 5 made from CoPtCr—$SiO_2$ and having a layer thickness of 17.5 nm, and a protective layer 8 made from Ta and having a layer thickness of 3 nm. The layer structure of Example 1 (E1) can be represented by AlMg/CoZrTa/Ta/Pt/Ru/$Mn_{56}Ru_{44}$/CoPtCr—$SiO_2$/Ta from bottom to top along a direction (Y).

The first interlayer 61 and the antiferromagnetic layer 4 of Example 1 (E1) were formed separately by sputtering techniques under working pressures of 3 mTorr and 30 mTorr, respectively.

Example 2 (E2)

The perpendicular magnetic recording medium of Example 2 (E2) has a layer structure similar to that of Example 1 (E1), except that the antiferromagnetic layer 4 is made from $Mn_{62}Ru_{38}$ (see Table 1).

Example 3 (E3)

The perpendicular magnetic recording medium of Example 3 (E3) has a layer structure similar to that of Example 1 (E1), except that the antiferromagnetic layer 4 is made from $Mn_{67}Ru_{33}$ (see Table 1)

Example 4 (E4)

The perpendicular magnetic recording medium of Example 4 (E4) has a layer structure similar to that of Example 1 (E1), except that the antiferromagnetic layer 4 is made from $Mn_{69}Ru_{31}$ (see Table 1)

Comparative Example (CE)

The perpendicular magnetic recording medium of Comparative Example (CE) has a layer structure similar to that of Example 1 (E1), except that the antiferromagnetic layer 4 is replaced with a Ru layer. The Ru layer has a layer thickness of 7 nm.

Figure 5:
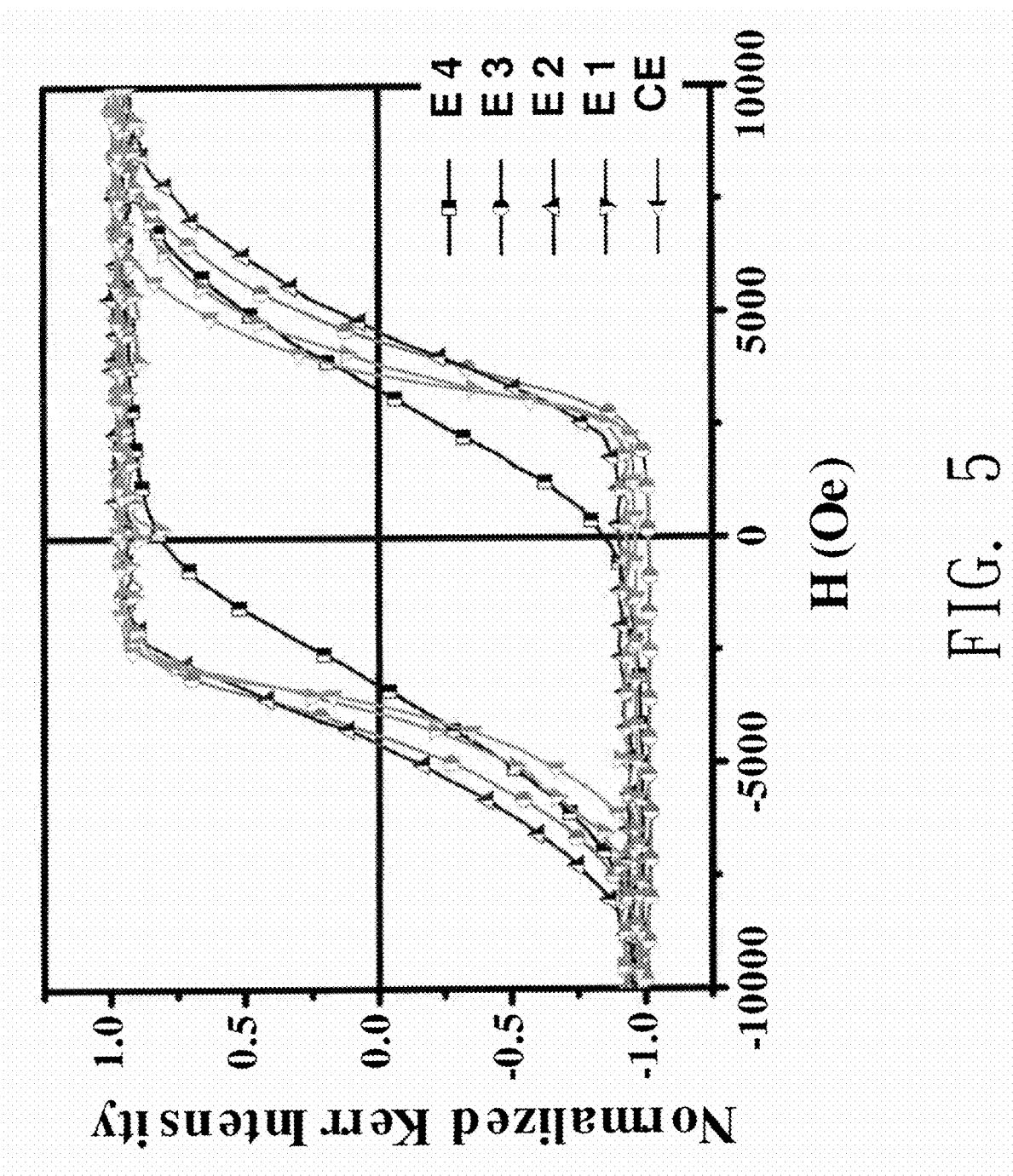
FIG. 5 is a hysteresis-loop plot to illustrate a comparison in the magnetic property between Examples (E1~E4) of the preferred embodiment and Comparative Example (CE)

The hysteresis-loops of Examples E1-E4 and Comparative Example CE (see FIG. 5) were obtained using a Magneto-optical Kerr Effect magnetometer (MOKE). The results show that the coercive field (Hc) of Comparative Example (CE) is only 3666 Oe, whereas the coercive fields of Examples 1~3 (E1~E3) are 3882 Oe, 4582 Oe and 4383 Oe, respectively. The squareness ($S_\perp$) of each Example (E1~E3), which was calculated based on the respective hysteresis-loop is 1 (see Table 1).

TABLE 1

| | Composition of the antiferromagnetic layer (at %)* | | | |
| --- | --- | --- | --- | --- |
| Exp. | Mn | Ru | Hc(Oe) | $S_\perp$ |
| CE | 0 | 100 | 3666 | 1 |
| E1 | 56 | 44 | 3882 | 1 |
| E2 | 62 | 38 | 4582 | 1 |

TABLE 1-continued

| | Composition of the antiferromagnetic layer (at %)* | | | |
| --- | --- | --- | --- | --- |
| Exp. | Mn | Ru | Hc(Oe) | $S_\perp$ |
| E3 | 67 | 33 | 4383 | 1 |
| E4 | 69 | 31 | 3294 | 0.85 |

*determined using an inductively coupled plasma mass spectrometry (ICP/MS)

Example 4 (E4) has lower coercive field (Hc) and squareness ($S_\perp$) as compared to Examples E1-E3 due to an excessive amount of $SiO_2$ segregated at CoPt grain boundaries attributed to the higher at % of Mn in the composition of the antiferromagnetic layer. The coercive field (Hc) and squareness ($S_\perp$) of Example 4 (E4) can be improved by replacing the complex material (CoPtCr—$SiO_2$) with the hard ferromagnetic alloy.

Figure 6B:
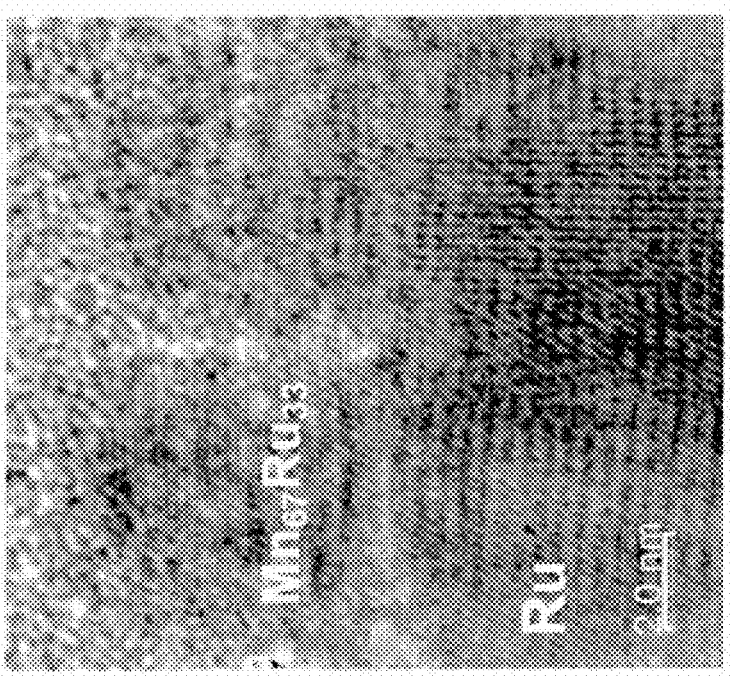
FIG. 6a and 6b are transmission electron microscope (TEM) vertical and cross-sectional images, respectively, to illustrate the grain configuration of an antiferromagnetic layer of Example 3 (E3)
Figure 6A:
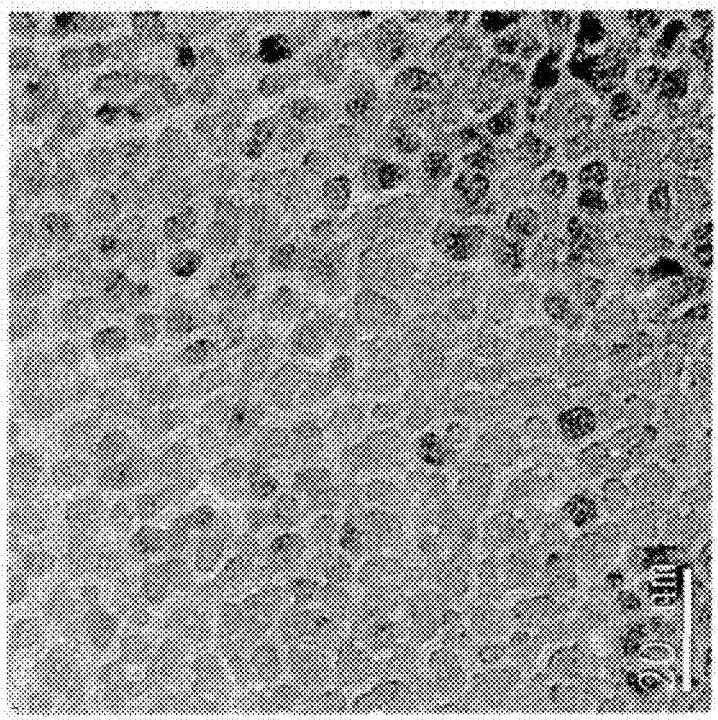

From the TEM vertical and cross-sectional images shown in FIGS. 6a and 6b, the antiferromagnetic layer 4 of Example 3 (E3) thus formed has cylindrical grains, each of which is surrounded with Mn grains.

Figure 7B:
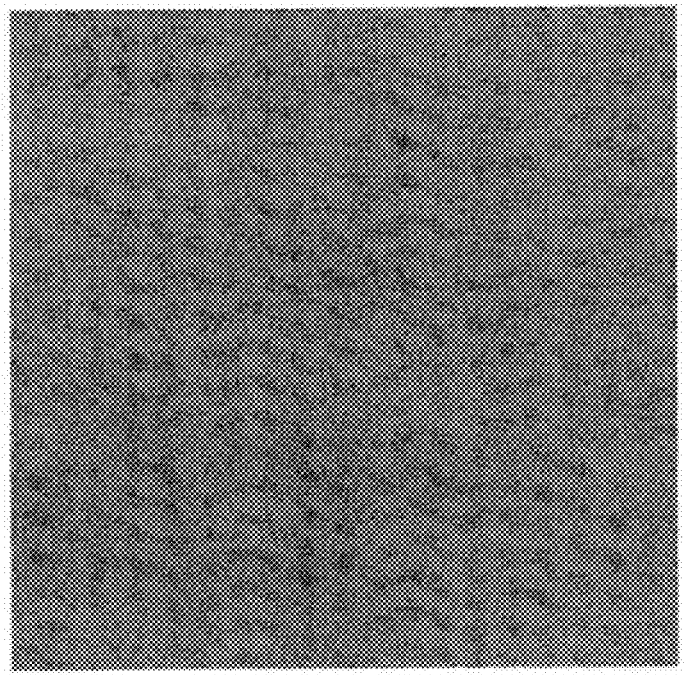
FIGS. 7a and 7b are TEM cross-sectional image and high-resolution transmission electron microscope (HRTEM) image obtained from inverse fast Fourier transformation (IFFT) techniques, respectively, to illustrate the crystal structure of the antiferromagnetic layer of Example 3 (E3)
Figure 7A:
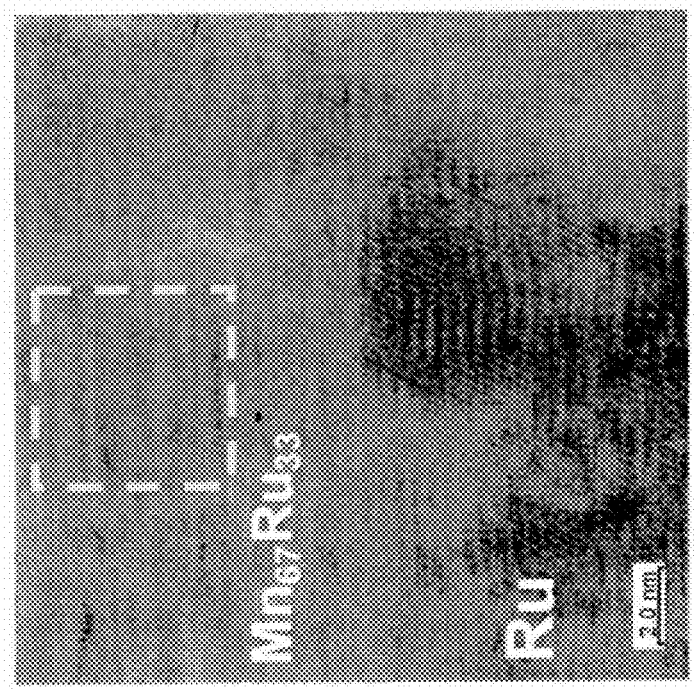

From the TEM cross-sectional image of FIG. 7a and the HRTEM image of FIG. 7b obtained through IFFT techniques, the antiferromagnetic layer 4 has a crystal structure with stacking faults (which will be described in more details in the following) which permit $SiO_2$ to be segregated at CoPt grain boundaries and to reduce the signal interference among the CoPt grains. The crystal structure of Example 3 (E3) is either a hcp crystal structure or a fcc crystal structure.

Figure 8:
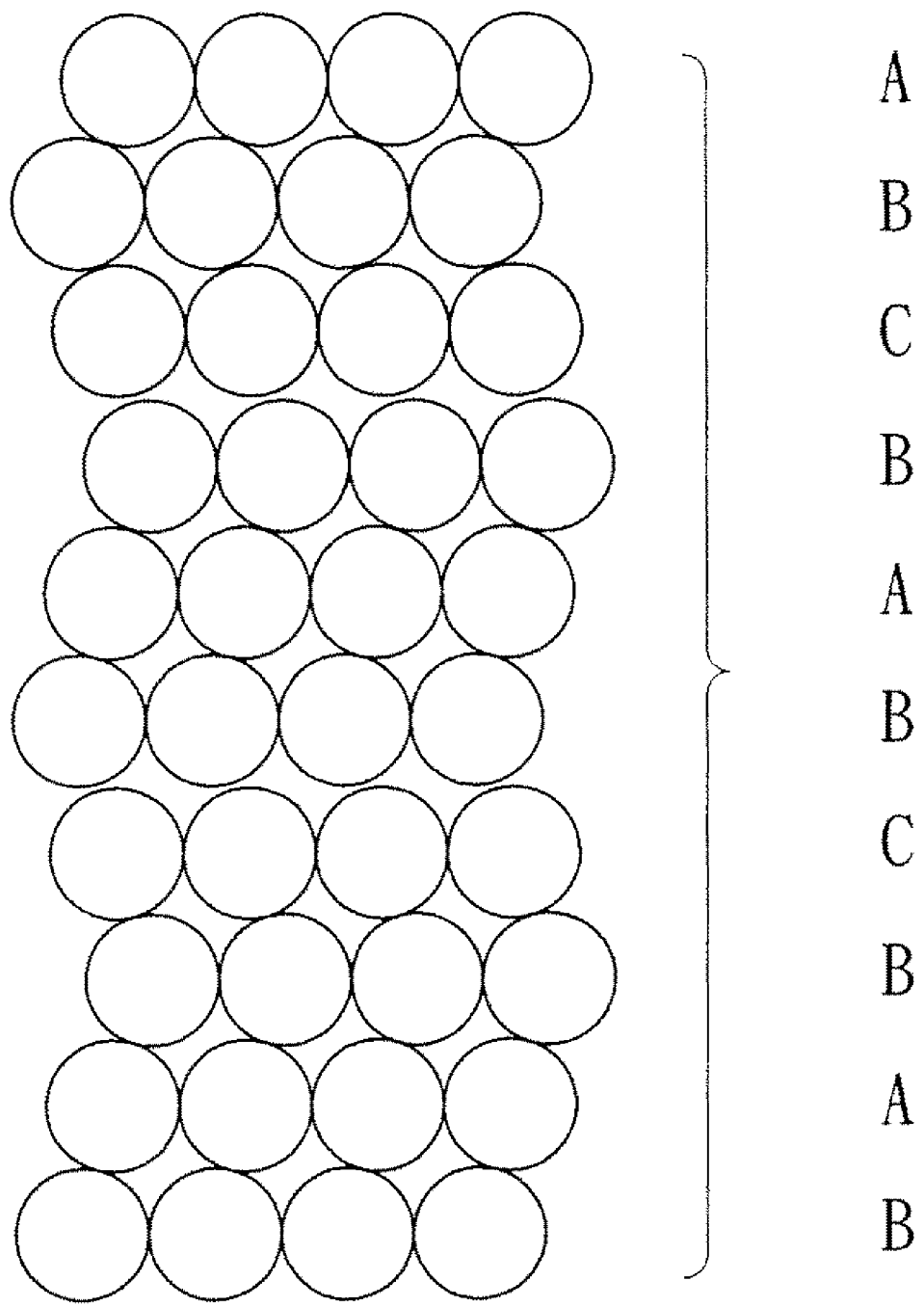
FIG. 8 is a schematic view of FIG. 7b to illustrate the extent of the stacking faults of the antiferromagnetic layer.

FIG. 8 illustrates a packing sequence of close-packed planes of the crystal structure of the antiferromagnetic layer 4 of Example 3 (E3). Before describing the packing sequence of close-packed planes of the crystal structure shown in FIG. 8, it is to be understood that ABCABCABC . . . represents a packing sequence of close-packed planes for fcc crystal structure, and ABABAB . . . represents a packing sequence of close-packed planes for hcp crystal structure. In FIG. 8, the packing sequence of close-packed planes of the crystal structure can be represented from top to bottom by planes ABCBABCBAB . . . , i.e., there is one B plane between two adjacent sets of ABC planes, which shows a fcc crystal structure with stacking faults (i.e., B planes), or from bottom to top by planes BABCBABCBA . . . , i.e., there is one C plane between two adjacent sets of BAB planes, which shows a hcp crystal structure with stacking faults (i.e., C planes).

In conclusion, by forming the perpendicular magnetic recording layer 5 on the antiferromagnetic layer 4 so as to generate an exchange-coupling between the antiferromagnetic layer 4 and the perpendicular magnetic recording layer 5, the magnetic anisotropy energy (Ku) and the coercive field (Hc) of the perpendicular magnetic recording layer 5 can be considerably increased, and the signal interference among the magnetic grains of the perpendicular magnetic recording layer 5 can be decreased.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A perpendicular magnetic recording medium comprising:
   a substrate;
   an antiferromagnetic layer that has a hexagonal close-packed crystal structure and that is disposed above said substrate; and
   a perpendicular magnetic recording layer formed on said antiferromagnetic layer and exchange-coupled to said antiferromagnetic layer,
   wherein said antiferromagnetic layer contains a Mn-based alloy,
   wherein said Mn-based alloy has a formula of $Mn_xZ_{100-x}$, in which x ranges from 50 at % to 68 at %, and Z is selected from the group consisting of Ru, Os, Co, and combinations thereof.

2. The perpendicular magnetic recording medium of claim 1, wherein x ranges from 60 at % to 68 at %.

3. The perpendicular magnetic recording medium of claim 1, wherein Z is Ru.

4. The perpendicular magnetic recording medium of claim 3, wherein said perpendicular magnetic recording layer is made from a complex material containing a hard ferromagnetic alloy and an oxide, said hard ferromagnetic alloy being Co-based alloy or Fe-based alloy.

5. The perpendicular magnetic recording medium of claim 4, wherein said antiferromagnetic layer is formed of cylindrical grains, each of which has an axis substantially normal to said substrate.

6. The perpendicular magnetic recording medium of claim 4, wherein said antiferromagnetic layer has a crystal structure with stacking faults.

7. The perpendicular magnetic recording medium of claim 3, wherein said antiferromagnetic layer has a layer thickness ranging from 2 nm to 15 nm.

* * * * *